(12) United States Patent
Riegger et al.

(10) Patent No.: US 8,360,036 B2
(45) Date of Patent: *Jan. 29, 2013

(54) METHOD AND SYSTEM FOR CONTROLLING ENGINE EXHAUST

(75) Inventors: John Christopher Riegger, Ann Arbor, MI (US); Shuya Shark Yamada, Novi, MI (US); Steven Paul Penkevich, New Hudson, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/354,991

(22) Filed: Jan. 20, 2012

(65) Prior Publication Data

US 2012/0110996 A1   May 10, 2012

Related U.S. Application Data

(63) Continuation of application No. 12/857,302, filed on Aug. 16, 2010, now Pat. No. 8,100,117.

(51) Int. Cl.
 F02M 25/07  (2006.01)
 F02B 47/08  (2006.01)
 F02B 33/44  (2006.01)
 F02B 75/12  (2006.01)
 F02D 13/02  (2006.01)

(52) U.S. Cl. .......... 123/568.14; 123/315; 123/90.15; 60/605.2

(58) Field of Classification Search .......... 123/58.8, 123/90.15–90.18, 193.5, 315, 316, 432, 568.11, 123/568.13, 568.14; 701/101–103, 108; 60/320, 321, 323, 605.2
See application file for complete search history.

(56) References Cited

U.S. PATENT DOCUMENTS

| 2,727,355 A | 12/1955 | Wosika |
| 3,488,723 A | 1/1970 | Veazie |
| 3,744,463 A | 7/1973 | McFarland, Jr. |
| 4,759,181 A | 7/1988 | Biritz |
| 4,800,720 A | 1/1989 | Okada |
| 4,860,700 A | 8/1989 | Smith |
| 5,279,266 A | 1/1994 | Landfahrer et al. |
| 5,870,993 A | 2/1999 | Stellet et al. |
| 5,934,263 A | 8/1999 | Russ et al. |
| 6,295,963 B1 | 10/2001 | Kollock et al. |
| 6,513,506 B1 | 2/2003 | Ito et al. |
| 6,672,296 B2 | 1/2004 | Ito et al. |
| 7,143,727 B1 | 12/2006 | Winstead et al. |
| 7,219,634 B2 * | 5/2007 | Hitomi et al. ............ 123/58.8 |
| 7,367,294 B2 | 5/2008 | Rozario et al. |
| 8,100,117 B2 * | 1/2012 | Riegger et al. .......... 123/568.14 |

(Continued)

FOREIGN PATENT DOCUMENTS

WO   2009093120 A1   7/2009

OTHER PUBLICATIONS

Riegger, John Christopher et al., "Integrated Exhaust Manifold," U.S. Appl. No. 12/857,349, filed Aug. 16, 2010, 44 pages.

(Continued)

*Primary Examiner* — Willis R Wolfe, Jr.
(74) *Attorney, Agent, or Firm* — Julia Voutyras; Alleman Hall McCoy Russell & Tuttle LLP

(57) ABSTRACT

An engine having one of a plurality of exhaust valves in each cylinder that may be deactivated is disclosed. In one example, one exhaust valve of each cylinder is deactivated in response to engine speed. The engine may have improved engine torque at low engine speeds and reduced time to torque (e.g., turbo lag).

10 Claims, 6 Drawing Sheets

U.S. PATENT DOCUMENTS

| | | |
|---|---|---|
| 2003/0000211 A1 | 1/2003 | Drangel et al. |
| 2004/0040521 A1 | 3/2004 | Hardin |
| 2005/0016496 A1 | 1/2005 | Hitomi et al. |
| 2005/0066918 A1 | 3/2005 | Yamakawa et al. |
| 2005/0193966 A1 | 9/2005 | Mac Vicar et al. |
| 2007/0215074 A1 | 9/2007 | Rozario et al. |
| 2009/0126659 A1 | 5/2009 | Lester et al. |
| 2010/0037595 A1 | 2/2010 | Kaneko et al. |

OTHER PUBLICATIONS

Brewer, Todd Jay et al., "Engine with Cylinder Head Cooling," U.S. Appl. No. 12/835,988, filed Jul. 14, 2010, 40 pages.

* cited by examiner

METHOD AND SYSTEM FOR CONTROLLING ENGINE EXHAUST

CROSS REFERENCE TO RELATED APPLICATIONS

The present application is a continuation of U.S. patent application Ser. No. 12/857,302 filed Aug. 16, 2010, the entire contents of which are incorporated herein by reference for all purposes.

BACKGROUND/SUMMARY

Engine manufacturers are reducing engine displacement and boosting air supplied to engines to provide a desired level of engine power with reduced fuel consumption. For example, a turbocharged four cylinder engine can output power that is substantially equivalent to a normally aspirated six cylinder engine. And, reducing an engine from six cylinders to four cylinders can reduce engine friction and pumping work, thereby reducing engine fuel consumption. In U.S. Patent Application Publication 2003/0000211, an engine system that routes exhaust gases to a turbocharger via two separate exhaust manifolds is described. The system purportedly improves delivery of exhaust gases to the turbocharger.

The inventors herein have recognized various shortcomings with the exhaust manifold disclosed in U.S. Patent Application Publication 2003/0000211. For example, the system requires two separate exhaust manifolds. Further, the engine air-fuel control may be complicated by the two exhaust manifolds. Further still, the described turbocharger appears to require two exhaust gas inputs.

The inventors herein have recognized the above-mentioned disadvantages and have developed an engine operating method, comprising: combusting an air-fuel mixture in each cylinder of an engine; routing exhaust gases of each cylinder through a single exhaust manifold; deactivating solely one exhaust valve of each cylinder of the engine during a first engine operating condition, the deactivated solely one exhaust valve of each cylinder deactivated for at least two engine cycles; and activating the solely one exhaust valve of each cylinder during a second engine operating condition.

By deactivating a single exhaust valve of each cylinder of an engine exhaust gases produced by combustion in the cylinders can be routed to a turbocharger in a way that increases turbocharger efficiency at lower engine speeds. In particular, when a first exhaust valve of a cylinder is deactivated at lower engine speeds, the velocity of exhaust gases expelled from the cylinder via a second exhaust valve can be increased to impart additional energy to a turbocharger located in the exhaust system downstream of the cylinder. Further, exhaust gas residuals can also be reduced when one of the two exhaust valves is deactivated at lower engine speeds. The increased turbocharger efficiency and lower cylinder exhaust residuals allow the engine to produce additional torque at lower engine speeds.

The present description may provide several advantages. For example, the approach may improve fuel economy by improving low speed engine torque. Further, the approach may be implemented with a single exhaust manifold and a less complicated fuel control strategy as compared to other approaches. Further still, approach may provide the above advantages at a cost that is lower than other approaches.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
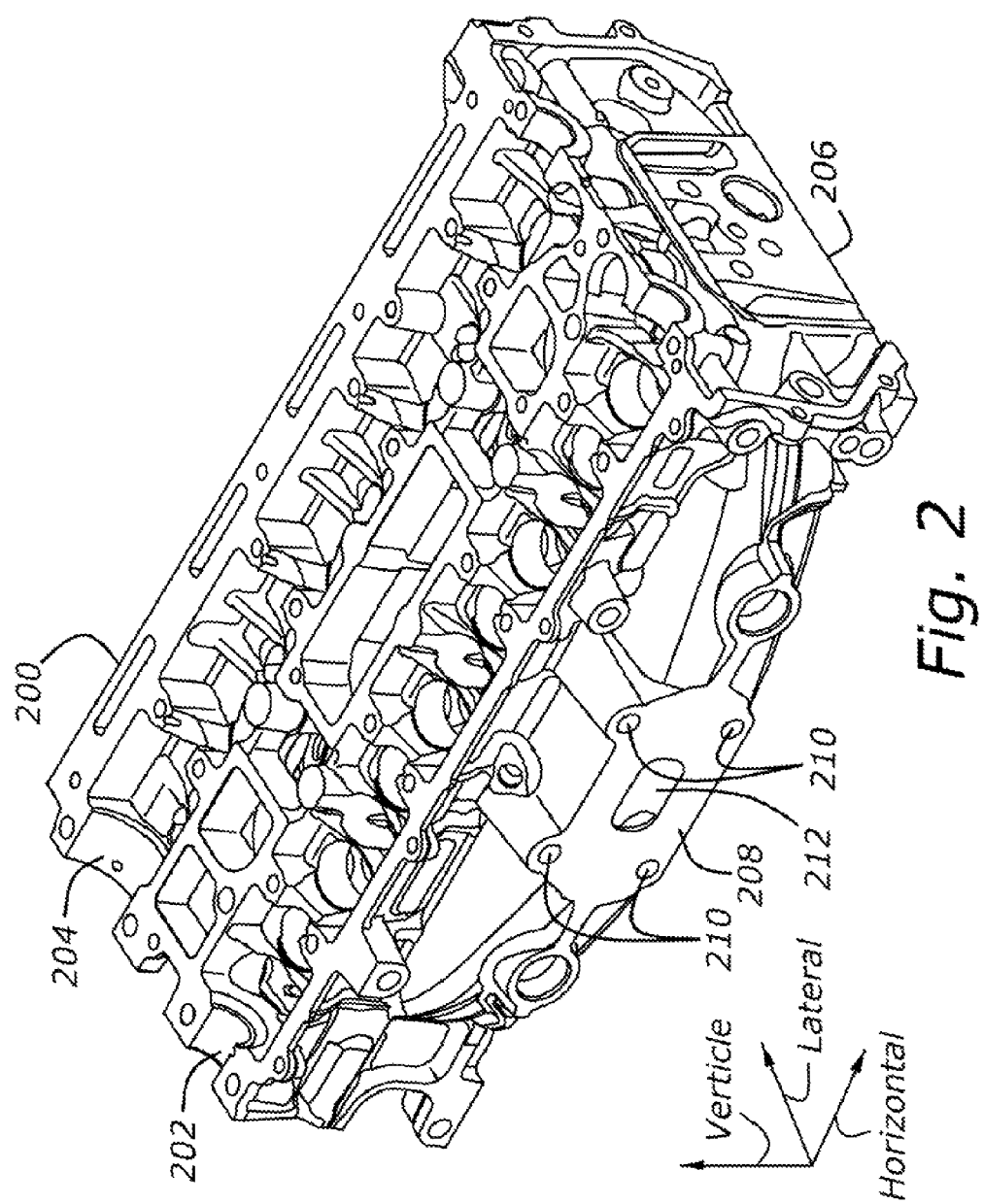
FIG. 2 shows a perspective schematic depiction of an engine cylinder head including an integrated exhaust manifold.
Figure 3:
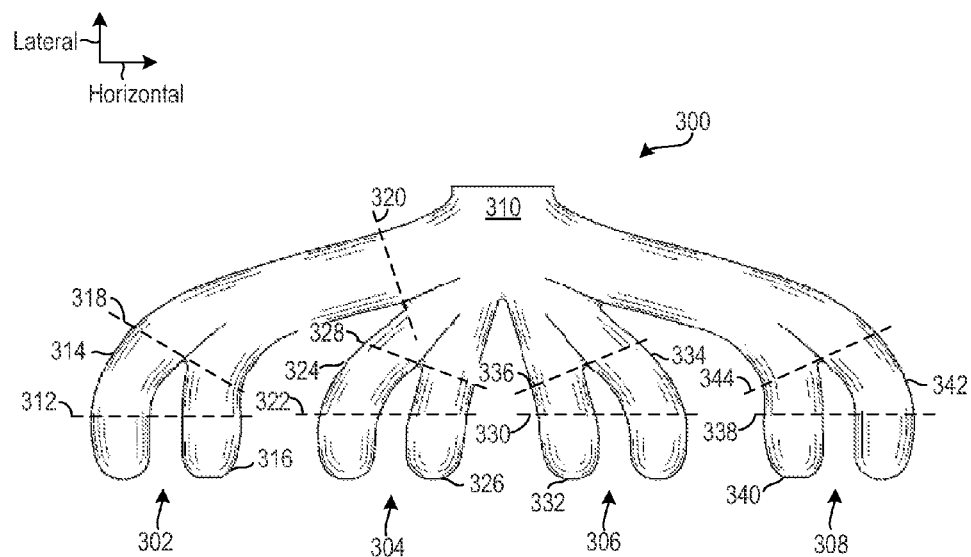
FIG. 3 shows an illustration of an exhaust manifold core of the exhaust manifold illustrated in FIG. 2.
Figure 4:
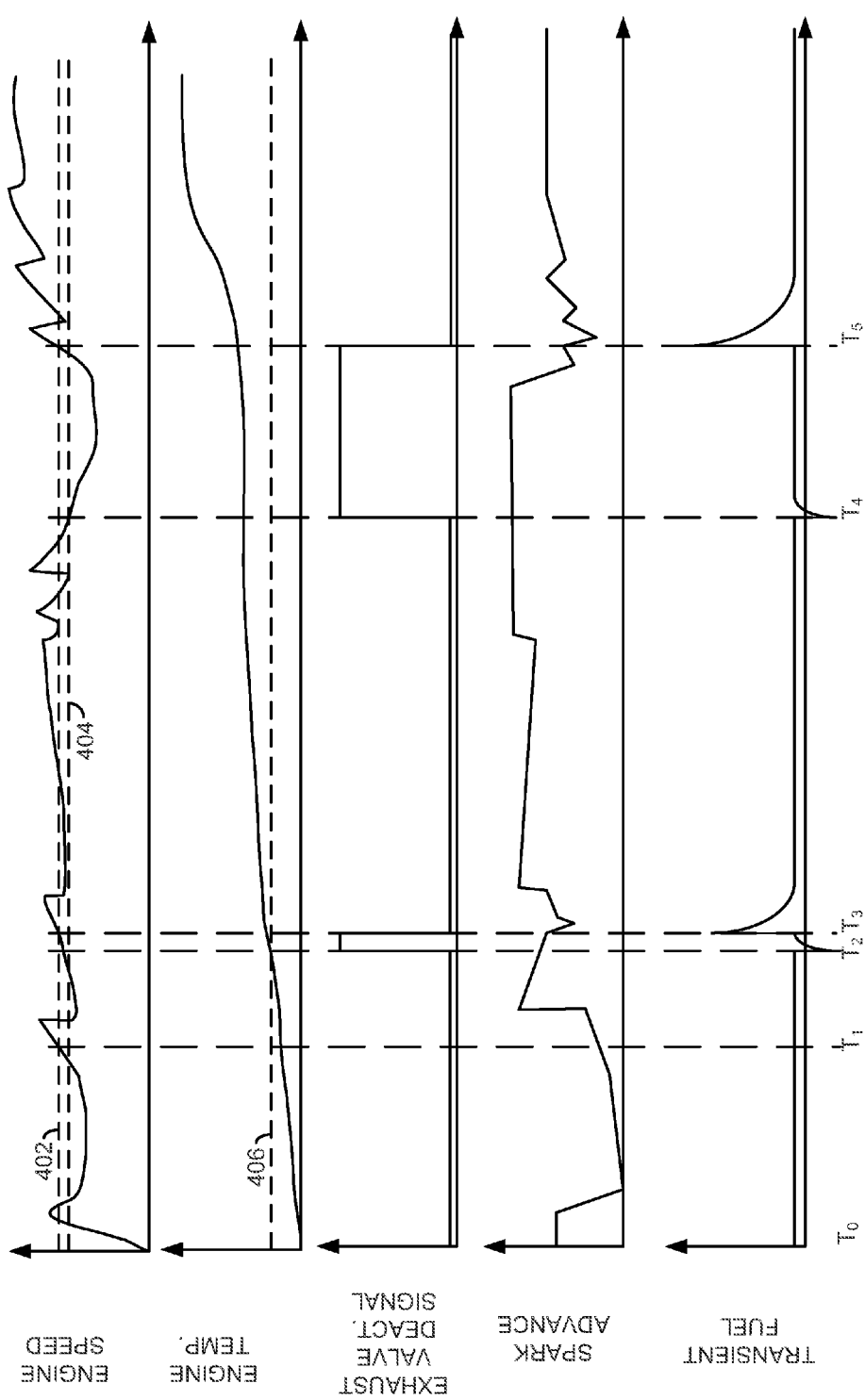
FIG. 4 shows simulated signals of interest during an engine operating sequence.
Figure 5:
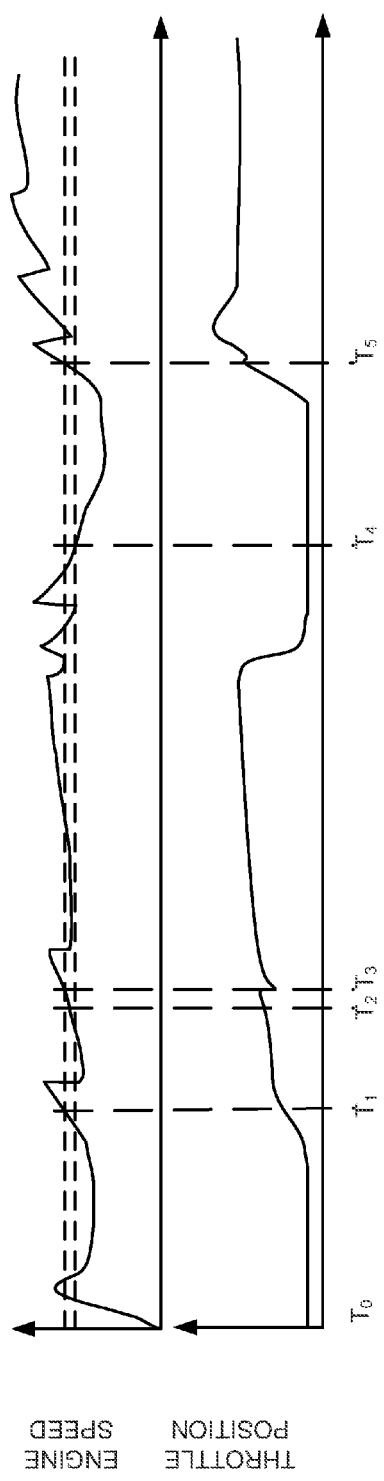
FIG. 5 shows additional simulated signals of interest during an engine operating sequence of FIG. 4.

The present description is related to exhaust valve control for an engine. In one example, the engine has an exhaust manifold integrated into the cylinder head as shown in FIGS. 2-3. The engine can be operated as shown in FIGS. 4-5 according to the method shown in FIG. 6, and the method of FIG. 6 may be executed by a controller as shown in FIG. 1.

Figure 1:
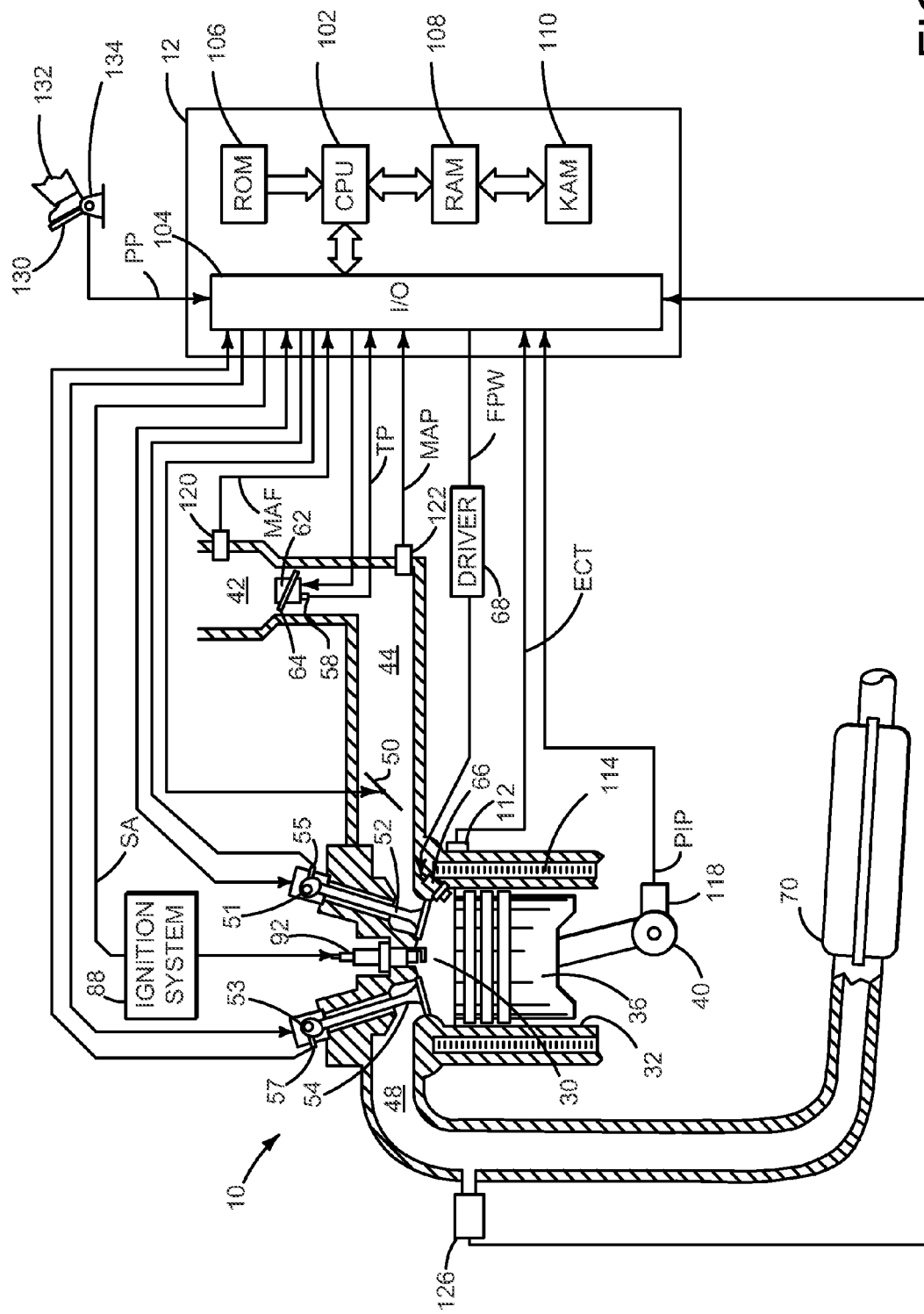
FIG. 1 shows a schematic depiction of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. Intake manifold 44 includes charge motion control valve 50 for controlling charge motion within cylinder 30. In one example, a low pressure direct injection system may be used, where fuel pressure can be raised to approximately 20-30 bar. Alternatively, a high pressure, dual stage, fuel system may be used to generate higher fuel pressures.

Engine 10 is separated into two regions for lubrication purposes. The first region comprises the path air passes through engine 10 and it includes the intake manifold, intake runners within the cylinder head, the combustion chamber, and exhaust ports leading from the cylinder. The second region includes the engine crankcase, cylinder head area having moving components excluding the combustion chamber, and oil galleries. Pressurized engine oil is supplied to the second region to lubricate moving components within the engine while it is desirable to keep oil from entering the first region. However, oil may be present at boundaries between the two regions to lubricate moving parts, at cylinder walls for example.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Referring now to FIG. 2, a perspective view of a cylinder head having an integrated exhaust manifold is shown. Cylinder head 200 includes cam journal 202 for supporting overhead exhaust camshaft (not shown). Cylinder head 200 also includes cam journal 204 for supporting overhead intake camshaft (not shown). Cylinder head bottom 206 is configured to couple to an engine block (not shown) thereby forming the engine combustion chambers. Exhaust manifold flange 208 includes bolt holes 210 for coupling a turbocharger (not shown) to cylinder head 200. Exhaust manifold outlet 212 directs exhaust gases from cylinder exhaust manifold runners (not shown) to a turbocharger (not shown).

Referring now to FIG. 3, exhaust manifold core 300 of the exhaust manifold illustrated in FIG. 2 is shown. The core is shown to illustrate areas within the exhaust manifold integrated into cylinder head 200 of FIG. 2. Engine cylinders are positioned on the side of core 300 near labels 302, 304, 306, and 308.

Cylinder number one exhaust runner 302 includes conduit 314 and conduit 316 for directing exhaust gases from cylinder number one to exhaust collector area 310. Exhaust valve number one (not shown) of cylinder number one limits flow between conduit 314 and cylinder number one. Exhaust valve number two (not shown) of cylinder number one limits flow between conduit 316 and cylinder number one. Exhaust valve number two of cylinder number one can be selectively deactivated in a closed position. In one example, exhaust valve number two is deactivated by a lost motion tappet. In other examples, exhaust valve number two may be deactivated by an adjustable cam profile. The cross-sectional area of cylinder number one exhaust runner 302 increases from cutting plane line 312 to cutting plane line 318. Further, the cross-sectional area of cylinder number one exhaust runner 302 decreases from cutting plane line 318 to cutting plane line 320. Thus, the cross-sectional area of cylinder number one exhaust runner 302 expands and contracts before meeting collector area 310.

Cylinder number two exhaust runner 304 includes conduit 324 and conduit 326 for directing exhaust gases from cylinder number one to exhaust collector area 310. Exhaust valve number one (not shown) of cylinder number one limits flow between conduit 324 and cylinder number two. Exhaust valve number two (not shown) of cylinder number two limits flow between conduit 326 and cylinder number two. Exhaust valve number one of cylinder number two can be selectively deactivated in a closed position. In one example, exhaust valve number one is deactivated by a lost motion tappet. In other examples, exhaust valve number one may be deactivated by an adjustable cam profile. The cross-sectional area of cylinder number two exhaust runner 304 decreases from cutting plane line 322 to cutting plane line 328. Thus, the cross-sectional area of cylinder number two exhaust runner 304 contracts before meeting collector area 310.

Cylinder number three exhaust runner 306 includes conduit 332 and conduit 334 for directing exhaust gases from cylinder number three to exhaust collector area 310. Exhaust valve number one (not shown) of cylinder number one limits flow between conduit 332 and cylinder number three. Exhaust valve number two (not shown) of cylinder number three limits flow between conduit 334 and cylinder number three. Exhaust valve number two of cylinder number three can be selectively deactivated in a closed position. In one example, exhaust valve number two is deactivated by a lost motion tappet. In other examples, exhaust valve number two may be deactivated by an adjustable cam profile. The cross-sectional area of cylinder number three exhaust runner 306 decreases from cutting plane line 330 to cutting plane line 336. Thus, the cross-sectional area of cylinder number three exhaust runner 306 contracts before meeting collector area 310.

Cylinder number four exhaust runner 308 includes conduit 340 and conduit 342 for directing exhaust gases from cylinder number four to exhaust collector area 310. Exhaust valve number one (not shown) of cylinder number four limits flow between conduit 340 and cylinder number one. Exhaust valve number two (not shown) of cylinder number four limits flow between conduit 342 and cylinder number four. Exhaust valve number one of cylinder number four can be selectively deactivated in a closed position. In one example, exhaust valve number one is deactivated by a lost motion tappet. In other examples, exhaust valve number one may be deactivated by an adjustable cam profile. The cross-sectional area of cylinder number four exhaust runner 308 increases from cutting plane line 338 to cutting plane line 344. Further, the cross-sectional area of cylinder number four exhaust runner 308 decreases from cutting plane line 344 before reaching collector 310. Thus, the cross-sectional area of cylinder number four exhaust runner 342 expands and contracts before meeting collector area 310.

Thus, the system of FIGS. 1-3 provides for an engine system, comprising: an engine including a single exhaust manifold; an exhaust valve deactivation apparatus, the exhaust valve deactivation apparatus mechanically solely deactivating one exhaust valve of each cylinder of the engine for at least two engine cycles; and an exhaust cam for operating at least one exhaust valve of each cylinder of the engine when the exhaust valve deactivation apparatus mechanically solely deactivates one exhaust valve of each cylinder of the engine. The engine system further comprises an intake valve cam configured to operate two intake valves when the exhaust valve deactivation apparatus mechanically solely deactivates one exhaust valve of each cylinder of the engine. The engine system further comprises a controller with instructions for deactivating the solely one exhaust valve of each cylinder during a first operating condition, the controller further comprising instructions for activating the solely one exhaust valve of each cylinder during a second engine operating condition. The engine system includes where the single exhaust manifold is integrated into a cylinder head. The engine system including where the exhaust valve deactivation apparatus is configured to deactivate an exhaust valve at a first location of a first cylinder, and where the exhaust valve deactivation apparatus is configured to deactivate an exhaust valve at a second location of a second cylinder, the second location different from the first location. The engine system further comprises a turbocharger, and where the turbocharger is coupled to the cylinder head. The engine system further comprises a controller with instructions for adjusting fuel supplied to engine cylinders during a transition from a condition where at least one exhaust valve is deactivated to a condition where all exhaust valves of the engine are activated.

Referring now to FIGS. 4-5, simulated signals of interest during an engine operating sequence are shown. FIG. 4 shows five signals of interest during the engine operating sequence. FIG. 5 repeats one signal of FIG. 4 to illustrate the interrelationship of signals illustrated in FIGS. 4 and 5. Vertical markers $T_0$-$T_5$ identify particular times of interest during the operating sequence.

The first plot from the top of FIG. 4 shows engine speed versus time. Time starts at the left side of the plot and increases to the right. Engine speed is lowest at the bottom of the plot and increases toward the top of the plot. Horizontal marker 402 represents an exhaust valve activation engine speed and horizontal marker 404 represents an exhaust valve deactivation engine speed.

The second plot from the top of FIG. 4 shows engine temperature versus time. Time starts at the left side of the plot and increases to the right. Engine temperature is lowest at the bottom of the plot and increases toward the top of the plot. Horizontal marker 406 represents an exhaust valve deactivation temperature (e.g., an engine temperature where exhaust valves may be deactivated).

The third plot from the top of FIG. 4 shows an exhaust valve deactivation signal versus time. Time starts at the left side of the plot and increases to the right. When the exhaust valve deactivation signal is low, the exhaust valve is not deactivated. When the exhaust valve deactivation signal is high, the exhaust valve is deactivated.

The fourth plot from the top of FIG. 4 shows spark advance amount versus time. Time starts at the left side of the plot and increases to the right. Spark timing is more retarded at the bottom of the plot. Thus, spark timing is advanced from the bottom of the plot to the top of the plot.

The fifth plot from the top of FIG. 4 shows transient fuel versus time. Time starts at the left side of the plot and increases to the right. The amount of fuel injected increases from the bottom of the plot to the top of the plot.

The first plot from the top of FIG. 5 is a repeat of the first plot from the top of FIG. 4. In particular, the first plot from the top of FIG. 5 shows engine speed versus time.

The second plot from the top of FIG. 5 shows engine intake throttle position versus time. Time starts at the left side of the plot and increase to the right. The engine intake throttle position is most closed at the bottom of the plot and the throttle opening increases toward the top of the plot.

At time $T_0$, the engine is started and engine speed increases and the settles to an idle speed shortly after the engine is started. Engine coolant temperature is low at time $T_0$ indicating that the engine has been cold started. The exhaust valve deactivator signal is low indicating that one exhaust valve of each engine cylinder are not deactivated at time $T_0$. In one example, the exhaust as described in the description of FIG. 3 can be deactivated. Engine spark is shown initially advanced and is then retarded during the engine idle period to increase exhaust heat to warm up a catalyst located in the exhaust system as shown in FIG. 1. Transient fuel supplied to the engine is at a constant low level at time $T_0$. In other examples, transient fuel may be adding or subtracting fuel during the start and during changes in engine load. Engine throttle is constant and at a low level at $T_0$.

At time $T_1$, engine speed is greater than a threshold speed where one exhaust valve of each cylinder may be solely activated. However, since all exhaust valves are active as indicated by the exhaust valve deactivation signal being low, the exhaust valves simply remain active. All engine exhaust valves are active at $T_1$ because engine temperature is less than the engine threshold temperature indicated by horizontal marker 406. Engine spark advance increases in response to engine torque demand and engine speed.

At time $T_2$, the engine temperature exceeds the threshold temperature indicated by horizontal marker 406 and engine speed is less than the exhaust valve activation engine speed as indicated by horizontal marker 402. As a result, solely one exhaust valve of each cylinder is deactivated. In one example, the exhaust valves that can be deactivated as described in FIG. 3 are deactivated. In particular, exhaust valve number two of cylinder number one, exhaust valve number one of cylinder number two, exhaust valve number two of cylinder number three, and exhaust valve number one of cylinder number four are deactivated. When one exhaust valve of each cylinder is deactivated at $T_2$, less residual exhaust gas remains in the cylinder after exhaust valve closing. As a result, engine torque and turbocharger performance may be improved at lower engine speeds.

Transient fuel is subtracted from the amount of fuel injected at $T_2$ so that a change in cylinder air flow may be compensated when one exhaust valve of each cylinder is deactivated. By adjusting the transient fuel amount, the engine exhaust gas oxygen concentration may be substantially maintained at a stoichiometric level.

In between time $T_2$ and time $T_3$, engine speed is increasing until the exhaust valve activation speed is reached at $T_3$. When engine speed reaches the exhaust valve activation speed at $T_3$, all engine exhaust valves are reactivated. In particular, solely one exhaust valve of each cylinder is reactivated at $T_3$. Reactivating the exhaust valve at $T_3$ allows the engine to flow higher rates of exhaust so that more air can flow into engine cylinders at higher engine speeds. Thus, reactivating the one deactivated exhaust valve of each cylinder improves engine breathing at higher engine speeds so that engine power output can be increased.

Transient fuel is added to the amount of fuel injected so that a concentration of oxygen in the exhaust gases remains substantially stoichiometric. Further, the throttle opening amount is decreased at $T_3$ to reduce the cylinder air charge so that the driver does not perceive a sudden change of engine torque. Further still, the spark advance can be retarded as shown at $T_3$ so that engine torque is smoothed as engine air flow increases.

In between time $T_3$ and time $T_4$, engine speed stays above the engine exhaust valve deactivation speed indicated by horizontal line 404. Consequently, all engine exhaust valves operate from time $T_3$ to time $T_4$.

At time $T_4$, engine speed falls below the exhaust valve deactivation speed and solely one exhaust valve of each cylinder is deactivated. Transient fuel also is lowered so that the amount of fuel injected to the engine is reduced during a transition to exhaust valve deactivation mode. Engine speed is falling and the engine throttle is substantially closed at time $T_4$ indicating that the engine is in a deceleration condition.

At time $T_5$, engine speed once again exceeds the exhaust valve activation speed so that the deactivated exhaust valves can be reactivated. The exhaust valve deactivation signal goes low indicating that deactivated exhaust valves are reactivated. The increase in cylinder air flow created by reactivating deactivated exhaust valves is compensated by adding transient fuel and retarding spark. In this way, engine torque can be smoothed so that the vehicle operator experiences monotonically increasing engine torque in response to increasing driver demand torque. In some examples, the transmission shift speed is selected to limit transitioning between exhaust valve activation and exhaust valve deactivation during vehicle acceleration. For example, the transmission is programmed to shift from first gear to second gear at an engine speed that ensures the engine speed will remain higher than the exhaust valve deactivation speed after the transmission enters second gear.

Figure 6:
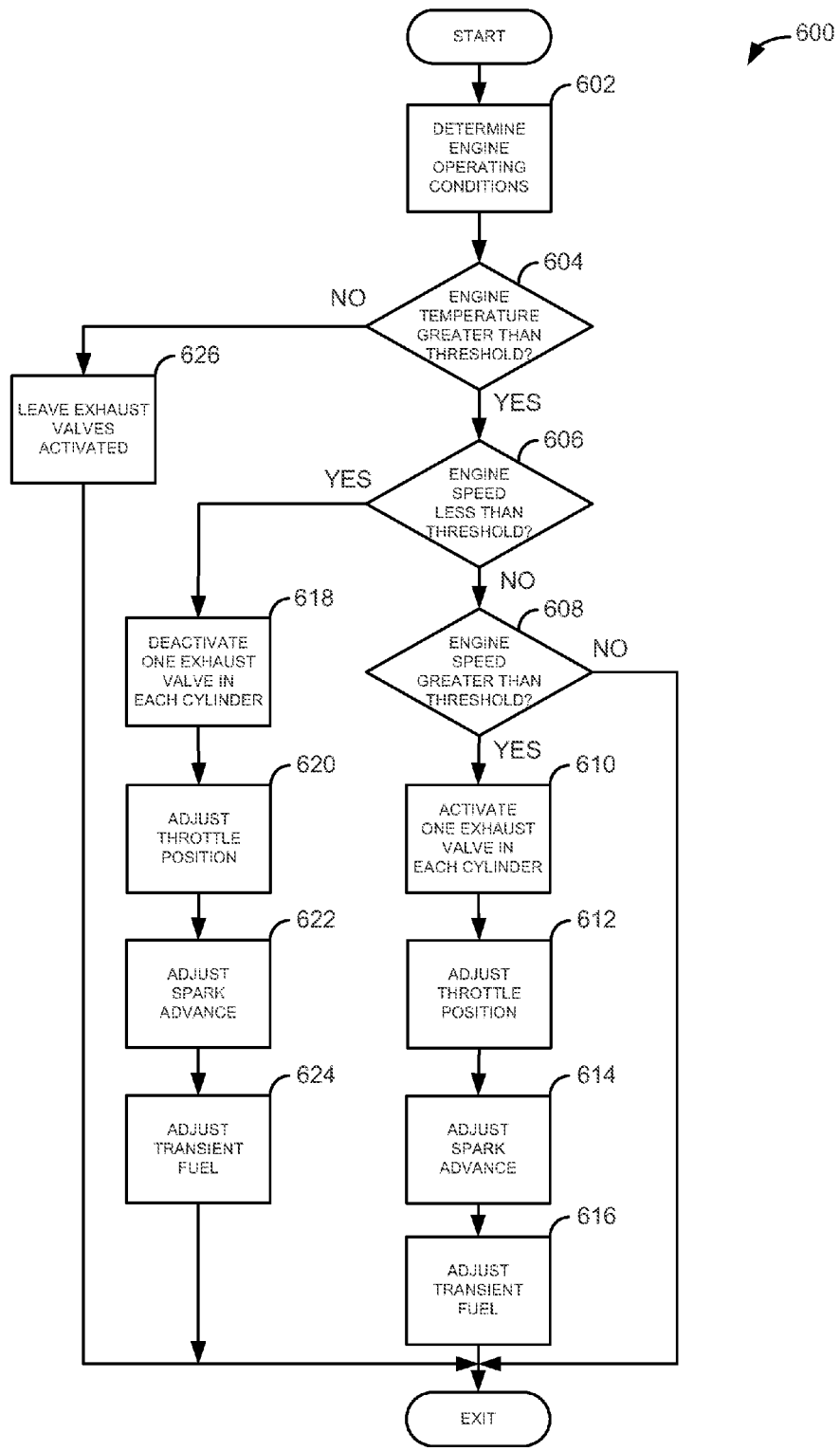
FIG. 6 shows a flowchart of a method to operate engine exhaust valves.

Referring now to FIG. 6, a flowchart of a method to operate engine exhaust valves is shown. At 602, routine 600 determines engine operating conditions. Engine operating conditions include but are not limited to engine speed, desired engine torque, engine temperature, throttle position, transmission gear, spark advance, and exhaust gas oxygen concentration. Routine 600 proceeds to 604 after engine operating conditions are determined.

At 604, routine 600 judges if engine temperature is greater than a threshold temperature. If so, routine 600 proceeds to 606. Otherwise, routine 600 proceeds to exit.

At 606, routine 600 judges if engine speed is less than a threshold speed. If so, routine 600 proceeds to 618. Otherwise, routine 600 proceeds to 608.

At 608, routine 600 judges if engine speed is greater than a threshold speed. If so, routine 600 proceeds to 610. Otherwise, routine 600 proceeds to exit. In this way, routine 600 provides for activating and deactivating solely one exhaust valve of each engine cylinder at different engine speeds.

In another example, routine 600 can be modified activate and deactivate solely one exhaust valve in further response to desired or actual engine load. For example, one exhaust valve of each cylinder can be deactivated when engine speed is less than a first threshold speed and when engine load is less than a first threshold engine load. If engine speed remains below the first threshold engine speed but engine load is greater than the first threshold engine load, the exhaust valves of each cylinder are reactivated. On the other hand, if engine load is less than the first threshold engine load, but engine speed is greater than the threshold engine speed, solely one exhaust valve of each cylinder is deactivated.

At 610, routine 600 activates the solely one deactivated exhaust valve of each engine cylinder. In one example, the exhaust valve may be reactivated by allowing oil to flow to a lost motion tappet. In another example, the exhaust valve may be reactivated by mechanically adjusting a cam lobe profile. The exhaust valves are sequentially reactivated during an engine cycle (e.g., two revolutions for a four-stroke engine). In one example, the exhaust valves are reactivated according to the engine firing order (e.g., 1-3-4-2 for a four cylinder engine). Of course, the exhaust valves may be reactivated starting with any cylinder in the order of combustion. For example, if conditions are present to reactivate engine exhaust valves during the exhaust stroke of cylinder number four, the exhaust valve of cylinder number two may be reactivated followed by the exhaust valves of cylinders one, three, and four.

In one example, when exhaust valves are reactivated the engine controller senses engine air flow to determine if engine air flow increases. In other examples, exhaust valve operation may be determined via a position sensor measuring a position of a mechanical actuator. In still other examples, intake manifold pressure or exhaust manifold pressure may be sensed to determine activation of individual cylinder exhaust valves.

At 612, routine 600 adjust the engine throttle position is adjusted in response to reactivating deactivated exhaust valves. The engine throttle opening is decreased during exhaust valve reactivation so that engine air flow is temporarily reduced so that engine torque is smoothly transitioned. In one example, the throttle opening amount is decreased according to an empirically determined amount that is based on engine speed and engine load. For example, if the engine exhaust valves are activated at a first engine speed and a first engine load, the throttle opening amount is reduced by a first amount during the exhaust valve reactivation period. If the engine exhaust valves are activated at a second engine speed and a second engine load, the throttle opening amount is reduced by a second amount during the exhaust valve reactivation period.

At 614, engine spark advance is adjusted in response to activating deactivated exhaust valves. In one example, engine spark is retarded in response to activating exhaust valves. In particular, engine spark is retarded in response to engine speed and engine load. For example, if the engine exhaust valves are activated at a first engine speed and a first engine load, the spark timing is retarded by a first amount during the exhaust valve reactivation period. If the engine exhaust valves are activated at a second engine speed and a second engine load, the spark timing is retarded by a second amount during the exhaust valve reactivation period. By adjusting spark timing engine torque disturbances during exhaust valve reactivation may be mitigated.

At 616, engine transient fuel is adjusted in response to activating deactivated exhaust valves. In one example, additional fuel is injected to engine cylinders during the exhaust valve reactivation. The amount of additional fuel injected to engine cylinders may be empirically determined and adjusted in response to engine speed and load. Further, the duration that additional fuel is injected to engine cylinders may be empirically determined in response to engine speed and load. If the engine is a port injected engine, fuel puddles may have to be established when engine exhaust valves are reactivated. Routine 600 exits after transient fuel is adjusted.

At 618, routine 600 deactivates solely one exhaust valve in each engine cylinder. In one example, the valves described in FIG. 3 are deactivated. In particular, exhaust valve number two of cylinders number one and three are deactivated and exhaust valve number one of cylinders number two and four are deactivated. Thus, there is symmetry in the deactivated exhaust valves between cylinders one and two with respect to cylinders three and four about the center of the engine. In one example, solely one exhaust valve of each cylinder is deactivated in order of the engine combustion order. For example, the exhaust valves of a four cylinder engine are deactivated in a 1-3-4-2 order. Of course, if the engine falls below the exhaust valve deactivation speed or load during the exhaust stroke of cylinder number four, the first exhaust valve deactivated is the exhaust valve of cylinder number two, then cylinder number one, then cylinder number three, and finally the exhaust valve of cylinder number four. The engine exhaust valves are deactivated for at least two engine cycles by activating and deactivating the exhaust valves at different engine speeds.

In one example, when exhaust valves are deactivated the engine controller senses engine air flow to determine if engine air flow decreases. For example, cylinder air flow during different portions of an engine cycle can be monitored to determine if air flow of individual cylinders change in response to exhaust valve deactivation. If no change in cylinder air flow is determined, it may be judged that an exhaust valve has not been deactivated. In other examples, exhaust valve deactivation may be determined via a position sensor measuring a position of a mechanical actuator. In still other examples, intake manifold pressure or exhaust manifold pressure may be sensed to determine deactivation of individual cylinder exhaust valves. For example, if an exhaust valve has not deactivated as desired, the intake manifold pressure may be higher in during one intake stroke as compared to during intake strokes of other cylinders because more exhaust residuals may occupy the cylinder. If an exhaust valve is not deactivated as desired, the engine controller may provide an indication of such a condition.

At 620, routine 600 adjusts the engine throttle position in response to deactivating activated exhaust valves. The engine throttle opening is increased during exhaust valve deactivation so that engine air flow is temporarily increased so that engine torque is smoothly transitioned. In one example, the throttle opening amount is increased according to an empirically determined amount that is based on engine speed and engine load. For example, if the engine exhaust valves are deactivated at a first engine speed and a first engine load, the throttle opening amount is increased by a first amount during the exhaust valve deactivation period. If the engine exhaust valves are deactivated at a second engine speed and a second engine load, the throttle opening amount is increased by a second amount during the exhaust valve deactivation period.

At 622, engine spark advance is adjusted in response to deactivating activated exhaust valves. In one example, engine spark is advanced in response to deactivating exhaust valves. In particular, engine spark is advanced in response to engine speed and engine load. For example, if the engine exhaust valves are deactivated at a first engine speed and a first engine load, the spark timing is advanced by a first amount during the exhaust valve deactivation period. If the engine exhaust valves are deactivated at a second engine speed and a second engine load, the spark timing is advanced by a second amount during the exhaust valve deactivation period. By adjusting spark timing engine torque disturbances during exhaust valve deactivation may be mitigated.

At 624, engine transient fuel is adjusted in response to deactivating activated exhaust valves. In one example, less fuel is injected to engine cylinders during the exhaust valve deactivation. The amount of fuel injected to engine cylinders may be empirically determined and adjusted in response to engine speed and load. Further, the duration that less fuel is injected to engine cylinders may be empirically determined in response to engine speed and load. If the engine is a port injected engine, fuel puddles may have to be reduced when engine exhaust valves are reactivated. Routine 600 exits after transient fuel is adjusted.

At 626, routine 600 leaves all exhaust valves activated or activates exhaust valves that are deactivated. When the engine is operated during cold conditions, engine oil may not flow as well as when engine oil is warm. Therefore, in some applications, exhaust valves may be remain in a default activated state until oil is at a temperature that ensures positive valve deactivation. Routine 600 exits after exhaust valves are activated at 626.

Thus, the method of FIG. 6 provides for an engine operating method, comprising: combusting an air-fuel mixture in each cylinder of an engine; routing exhaust gases of each cylinder through a single exhaust manifold; deactivating solely one exhaust valve of each cylinder of the engine during a first engine operating condition, the deactivated solely one exhaust valve of each cylinder deactivated for at least two engine cycles; and activating the solely one exhaust valve of each cylinder during a second engine operating condition. The engine operating method includes where the engine is a four cylinder engine, where an exhaust valve at a first location of a first cylinder is deactivated during the first engine operating condition, where an exhaust valve at a second location of a second cylinder is deactivated during the first engine operating condition, and where the first location is different from the second location. The engine operating method includes where an exhaust valve of a third cylinder is deactivated during the first engine operating condition, where the exhaust valve of the third cylinder is at a same location in the third cylinder as the second exhaust valve is in the second cylinder, and where an exhaust valve of a fourth cylinder is deactivated during the first engine operating condition, where the exhaust valve of the fourth cylinder is at a same location in the fourth cylinder as the first exhaust valve is in the first cylinder. The engine operating method includes where the first and fourth cylinders are at opposite ends of the engine, and where the second and third cylinders are located between the first and fourth cylinders. The engine operating method includes where the first engine operating condition is an engine speed less than a first threshold engine speed, and where the second engine operating condition is a second threshold engine speed, the second threshold engine speed greater than the first threshold engine speed, and where at least one exhaust valve of each cylinder remains active during deactivating the solely one exhaust valve of each cylinder. The engine operating method further comprises adjusting a position of a throttle when activating the solely one exhaust valve of each cylinder during the second engine operating condition, and where deactivating the solely one exhaust valve of each cylinder is in further response to engine load. The engine operating method includes where the exhaust valve at the first location of the first cylinder is activated during a same engine cycle as the exhaust valve at the second location of the second cylinder.

The method of FIG. 6 also provides for a method of improving engine operation, comprising: combusting an air-fuel mixture in each cylinder of an engine; routing exhaust gases of each cylinder through a single exhaust manifold, the single exhaust manifold integrated into a cylinder head, the single exhaust manifold having an inner pair of exhaust runners and an outer pair of exhaust runners, the inner pair of exhaust runners having a smaller cross-sectional area than the outer pair of exhaust runners; deactivating solely one exhaust valve of each cylinder when engine speed is less than a first threshold engine speed while leaving at least one exhaust valve of each cylinder active, the deactivated solely one exhaust valve of each cylinder deactivated for at least two engine cycles; and activating the solely one exhaust valve of each cylinder when engine speed is greater than a second threshold engine speed, the second threshold engine speed greater than the first threshold engine speed. The method includes where the engine is a four cylinder engine, where an exhaust valve at a first location of a first cylinder is deactivated when engine speed is less than a first threshold engine speed, where an exhaust valve at a second location of a second cylinder is deactivated when engine speed is less than a first threshold engine speed, and where the first location is different from the second location. The method includes where an exhaust valve of a third cylinder is deactivated when engine speed is less than a first threshold engine speed, where the exhaust valve of the third cylinder is at a same location in the third cylinder as the exhaust valve at the first location of the first cylinder, and where an exhaust valve of a fourth cylinder is deactivated when engine speed is less than a first threshold engine speed, where the exhaust valve of the fourth cylinder is at a same location in the fourth cylinder the exhaust valve at the second location in the second cylinder. The method further comprises retarding a spark timing of the engine during activating the solely one exhaust valve of each cylinder. The method further comprises a turbocharger coupled to an outlet of the single exhaust manifold. The method further comprises operating two intake valves of each cylinder of the engine when the solely one exhaust valve of each cylinder is deactivated.

As will be appreciated by one of ordinary skill in the art, the routine described in FIG. 6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method of improving engine operation, comprising:
   combusting an air-fuel mixture in each cylinder of an engine, each cylinder including a direct-injector;
   routing exhaust gases of each cylinder through a single exhaust manifold, the single exhaust manifold integrated into a cylinder head, the single exhaust manifold having an inner pair of exhaust runners and an outer pair of exhaust runners, the inner pair of exhaust runners having a smaller cross-sectional area than the outer pair of exhaust runners, a turbocharger coupled to the single exhaust manifold;
   deactivating solely one exhaust valve of each cylinder when engine speed is less than a first threshold engine speed while leaving at least one exhaust valve of each cylinder active, the deactivated solely one exhaust valve of each cylinder deactivated for at least two engine cycles; and
   activating the solely one exhaust valve of each cylinder when engine speed is greater than a second threshold engine speed, the second threshold engine speed greater than the first threshold engine speed.

2. The method of claim 1, further comprising retarding a spark timing of the engine during activating the solely one exhaust valve of each cylinder.

3. The method of claim 1, further comprising operating two intake valves of each cylinder of the engine when the solely one exhaust valve of each cylinder is deactivated.

4. The method of claim 1, where the engine is a four cylinder engine, where an exhaust valve at a first location of a first cylinder is deactivated when engine speed is less than the first threshold engine speed, where an exhaust valve at a second location of a second cylinder is deactivated when engine speed is less than the first threshold engine speed, and where the first location is different from the second location.

5. The method of claim 4, where an exhaust valve of a third cylinder is deactivated when engine speed is less than the first threshold engine speed, where the exhaust valve of the third cylinder is at a same location in the third cylinder as the exhaust valve at the first location of the first cylinder, and where an exhaust valve of a fourth cylinder is deactivated when engine speed is less than the first threshold engine speed, where the exhaust valve of the fourth cylinder is at a same location in the fourth cylinder as the exhaust valve at the second location in the second cylinder.

6. An engine system, comprising:
   an engine including a single exhaust manifold integrated into a cylinder head and a turbocharger;
   a direct-injection system;

an exhaust valve deactivation apparatus mechanically solely deactivating one exhaust valve of each engine cylinder for at least two engine cycles; and an exhaust cam for operating at least one exhaust valve of each engine cylinder when the exhaust valve deactivation apparatus mechanically solely deactivates one exhaust valve of each cylinder of the engine.

7. The engine system of claim 6, further comprising an intake valve cam configured to operate two intake valves when the exhaust valve deactivation apparatus mechanically solely deactivates one exhaust valve of each cylinder of the engine.

8. The engine system of claim 6, further comprising a controller with instructions for deactivating the solely one exhaust valve of each cylinder during a first operating condition, the controller further comprising instructions for activating the solely one exhaust valve of each cylinder during a second engine operating condition.

9. The engine system of claim 6, where the exhaust valve deactivation apparatus is configured to deactivate an exhaust valve at a first location of a first cylinder, and where the exhaust valve deactivation apparatus is configured to deactivate an exhaust valve at a second location of a second cylinder, the second location different from the first location.

10. The engine system of claim 9, further comprising a controller with instructions for adjusting fuel supplied to engine cylinders during a transition from a condition where at least one exhaust valve is deactivated to a condition where all exhaust valves of the engine are activated.

* * * * *